United States Patent
Wang et al.

(10) Patent No.: US 10,831,209 B2
(45) Date of Patent: Nov. 10, 2020

(54) USING A LONG-TERM RECURRENT CONVOLUTIONAL NETWORK TO PLAN A SEQUENCE OF LATERAL CONTROLS IN AUTONOMOUS DRIVING

(71) Applicants: Zijian Wang, Troy, MI (US); Sean Crutchlow, Auburn Hills, MI (US)

(72) Inventors: Zijian Wang, Troy, MI (US); Sean Crutchlow, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 177 days.

(21) Appl. No.: 16/225,029

(22) Filed: Dec. 19, 2018

(65) Prior Publication Data

US 2020/0201343 A1    Jun. 25, 2020

(51) Int. Cl.
*G05D 1/02* (2020.01)
*G05D 1/00* (2006.01)
(Continued)

(52) U.S. Cl.
CPC .......... *G05D 1/0221* (2013.01); *B60W 30/12* (2013.01); *G05D 1/0088* (2013.01); *G06K 9/00798* (2013.01); *G06N 3/08* (2013.01); *G06N 5/046* (2013.01); *G06N 20/00* (2019.01); *B60W 2710/207* (2013.01)

(58) Field of Classification Search
CPC ... G05D 1/0221; G05D 1/0088; B60W 30/12; B60W 2710/207; G06N 3/08; G06N 20/00; G06K 9/00798; G06K 9/00791
See application file for complete search history.

(56) References Cited

U.S. PATENT DOCUMENTS 10,034,630 B2 *  7/2018  Lee ..................... G05D 1/0221
10,176,388 B1 *  1/2019  Ghafarianzadeh ... G06N 3/0445
(Continued)

FOREIGN PATENT DOCUMENTS

CN    1945207 A    4/2007

OTHER PUBLICATIONS

Bhatt et al.; "Have I Reached the Intersection: A Deep Learning-Based Approach for Intersection Detection from Monocular Cameras"; 2017 IEEE/RSJ Intl. Conf. on Intelligent Robots and Systems (IROS); Sep. 24-28, 2017, Vancouver, BC, Canada (Year: 2017).*

(Continued)

*Primary Examiner* — Michael J Zanelli
(74) *Attorney, Agent, or Firm* — Ralph E Smith

(57) ABSTRACT

Systems and methods for planning and executing a sequence of lateral controls for a vehicle comprise determining a set of parameters comprising road lane lines, a pose of the vehicle, a movement state of the vehicle, and actions by a driver of the vehicle and, while operating the vehicle in an autonomous driving mode, obtaining a long-term recurrent convolutional network (LRCN) model that has been trained with training data captured during controlled test driving by a human driver, using the LRCN model and the set of parameters as inputs, determining a sequence of a plurality of desired steering wheel angles for the vehicle, and when the sequence of the plurality of desired steering wheel angles is verified via comparison to one or more mathematical models, controlling steering of the vehicle according to the sequence of a plurality of desired steering wheel angles.

16 Claims, 4 Drawing Sheets

(51) Int. Cl.
*B60W 30/12* (2020.01)
*G06N 3/08* (2006.01)
*G06N 20/00* (2019.01)
*G06K 9/00* (2006.01)
*G06N 5/04* (2006.01)

(56) References Cited

U.S. PATENT DOCUMENTS

| | | | |
|---|---|---|---|
| 10,676,085 B2* | 6/2020 | Smith | B60W 40/04 |
| 2017/0259801 A1 | 9/2017 | Abou-Nasr et al. | |
| 2019/0384303 A1* | 12/2019 | Muller | G01S 13/867 |
| 2020/0065711 A1* | 2/2020 | Clement | G06N 3/0454 |

OTHER PUBLICATIONS

Xu et al.; "End-to-end Learning of Driving Models from Large-scale Video Datasets"; Proc. of the IEEE Conf. on Computer Vision and Pattern Recognition; 2017; pp. 2174-2182 (Year: 2017).*

Chi, Lu, et al., "Deep Steering: Learning End-to-End Driving Model from Spatial and Temporal Visual Cues", arXiv: 1708.03798v1 [cs.CV], p. 1-12 (2017).

Donahue, Jeff, et al., "Long-Term Recurrent Convolutional Networks for Visual Recognition and Description", Computer Vision Foundation, CVF2018, p. 2625-2634 (2015).

Xu, Huazhe, et al., "End-to-end Learning of Driving Models from Large-scale Video Datasets", arXiv:1512/01079v2 [cs.CV] p. 1-9 (2017).

* cited by examiner

USING A LONG-TERM RECURRENT CONVOLUTIONAL NETWORK TO PLAN A SEQUENCE OF LATERAL CONTROLS IN AUTONOMOUS DRIVING

FIELD

The present application generally relates to vehicle advanced driver assistance systems (ADAS) and, more particularly, to techniques for using a long-term recurrent convolutional network (LRCN) to plan a sequence of lateral controls in autonomous driving.

BACKGROUND

For partially or fully autonomous driving (e.g., L4 or L5), vehicle advanced driver assistance systems (ADAS) must be capable of planning a sequence of lateral controls (e.g., steering angles) to keep the vehicle safely traveling along a road. Conventional solutions use extensively trained, very deep neural networks (DNNs). Implementing complex DNNs requires substantial processing power, particularly for acceptable operation in real-time, which is required for partial or fully autonomous driving. The processing requirements of these DNNs typically results in the implementation of a more costly and more power consumptive central processing unit (CPU) or graphical processing unit (GPU), which can reduce overall vehicle efficiency. Accordingly, while such vehicle ADAS do work well for their intended purpose, there remains a need for improvement in the relevant art.

SUMMARY

According to one example aspect of the invention, an advanced driver assistance system (ADAS) for a vehicle is presented. In one exemplary implementation, the ADAS comprises: a set of sensors configured to determine a set of parameters comprising road lane lines, a pose of the vehicle, a movement state of the vehicle, and actions by a driver of the vehicle, and a controller configured to operate the vehicle in an autonomous driving mode and during the autonomous driving mode: receive the set of parameters from the set of sensors, obtain a long-term recurrent convolutional network (LRCN) model that has been trained with training data captured during controlled test driving by a human driver, using the LRCN model and the set of parameters as inputs, determine a sequence of a plurality of desired steering wheel angles for the vehicle, verify the sequence of the plurality of desired steering wheel angles based on a comparison to outputs of one or more mathematical models that each model a specific driving scenario, and when the sequence of the plurality of desired steering wheel angles is verified, control steering of the vehicle according to the sequence of a plurality of desired steering wheel angles.

In some implementations, the set of sensors comprises a camera system configured to capture an image of a road on which the vehicle is traveling and detect lane lines on the road. In some implementations, the pose of the vehicle comprises yaw, pitch, and roll of the vehicle. In some implementations, the movement state of the vehicle comprises velocity, acceleration, road wheel angle, and angular acceleration of the vehicle. In some implementations, the actions by the driver of the vehicle comprise steering wheel angle, throttle position, and brake pedal position.

In some implementations, the one or more mathematical models comprise Simulink models. In some implementations, the controller is further configured to apply a penalty to the sequence of steering wheel angles at consecutive time steps to smooth the control of the steering of the vehicle. In some implementations, the controller does not utilize a deep neural network (DNN).

According to another example aspect of the invention, a method for planning and executing a sequence of lateral controls for a vehicle is presented. In one exemplary implementation, the method comprises: determining, by a set of sensors of the vehicle, a set of parameters comprising road lane lines, a pose of the vehicle, a movement state of the vehicle, and actions by a driver of the vehicle, operating, by a controller of the vehicle, in an autonomous driving mode, and during the autonomous driving mode: receiving, by the controller and from the set of sensors, the set of parameters, obtaining, by the controller, an LRCN model that has been trained with training data captured during controlled test driving by a human driver, using the LRCN model and the set of parameters as inputs, determining, by the controller, a sequence of a plurality of desired steering wheel angles for the vehicle, verifying, by the controller, the sequence of the plurality of desired steering wheel angles based on a comparison to outputs of one or more mathematical models that each model a specific driving scenario, and when the sequence of the plurality of desired steering wheel angles is verified, controlling, by the controller, steering of the vehicle according to the sequence of a plurality of desired steering wheel angles.

In some implementations, the set of sensors comprises a camera system configured to capture an image of a road on which the vehicle is traveling and detect lane lines on the road. In some implementations, the pose of the vehicle comprises yaw, pitch, and roll of the vehicle. In some implementations, the movement state of the vehicle comprises velocity, acceleration, road wheel angle, and angular acceleration of the vehicle. In some implementations, the actions by the driver of the vehicle comprise steering wheel angle, throttle position, and brake pedal position.

In some implementations, the one or more mathematical models comprise Simulink models. In some implementations, the method further comprises applying, by the controller, a penalty to the sequence of steering wheel angles at consecutive time steps to smooth the control of the steering of the vehicle. In some implementations, the controller does not utilize a DNN.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As discussed above, there exists a need for improvement in automated driver assistance systems (ADAS) capable of planning a sequence of lateral controls (e.g., steering angles) for partially or fully autonomous driving (e.g., L4 or L5). It will be appreciated that the term "ADAS" as used herein includes driver assistance systems (lane keeping, adaptive cruise control, etc.) as well as partially and fully autonomous driving systems. Conventional solutions use extensively trained, very deep neural networks (DNNs). These DNNs, however, can require substantial processing power and thus higher performance central processing units (CPUs) or graphical processing units (GPUs) than are typically implemented in vehicle controllers. Accordingly, techniques are presented for training a long-term recurrent convolutional network (LRCN) model using test data gathered during controlled vehicle testing by human drivers and then utilizing the LRCN model during an autonomous driving mode of the vehicle to plan a sequence of two or more steering wheel angles and then control vehicle steering according to the determined sequence of steering wheel angles.

Figure 1:
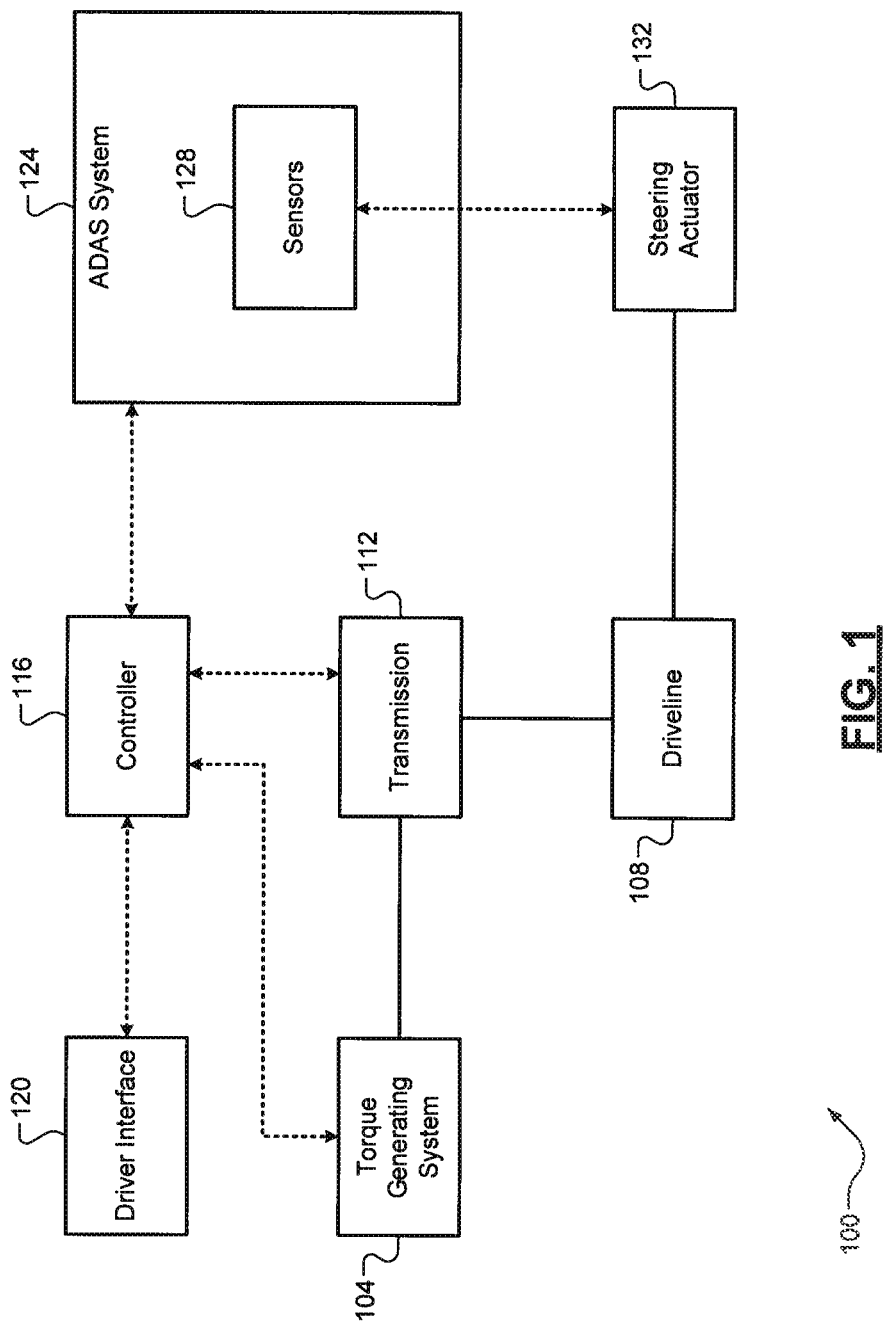
FIG. 1 is a functional block diagram of an example vehicle having an advanced driver assistance system (ADAS) with a standard camera/lens system according to some implementations of the present disclosure.

Referring now to FIG. 1, a functional block diagram of an example vehicle 100 is illustrated. The vehicle 100 comprises a torque generating system 104 (an engine, an electric motor, combinations thereof, etc.) that generates drive torque that is transferred to a driveline 108 via a transmission 112. A controller 116 controls operation of the torque generating system 104, such as to generate a desired drive torque based on a driver input via a driver interface 120 (a touch display, a steering wheel, an accelerator pedal, combinations thereof, etc.). While the ADAS 124 is illustrated as being separate from the controller 116, it will be appreciated that the ADAS 124 could be incorporated as part of the controller 116, or the ADAS 124 could have its own separate controller. The ADAS 124 or controller 116 of the present disclosure does not require a very high powered central processing unit (CPU) or graphical processing unit (GPU) that would be required by a very deep DNN.

The ADAS 124 comprises a set of one or more sensors 128. Non-limiting examples of the set of sensors 128 include a standard camera system 128 (e.g., a conventional, low resolution, industry-standard camera/lens system that is typically included on production vehicles), a radio detection and ranging (RADAR) system, a light detection and ranging (LIDAR) system, an inertial motion unit (IMU) system, and a real-time kinematic (RTK) system, a blind spot monitoring system, and the like. The set of sensors 128 are configured to measure a set of parameters that are used to train and then as real-time inputs to an LRCN model. Non-limiting examples of the set of parameters include road lane lines or markers (e.g., captured by the camera system), a pose of the vehicle, such as yaw, pitch, and roll (e.g., measured by the IMU system or other accelerometer based sensors), a movement state of the vehicle 100, such as velocity, acceleration, road wheel angle, and angular vehicle acceleration (e.g., measured by the IMU system or other speed, position, or accelerometer based sensors), and actions by a driver of the vehicle 100, such as steering wheel angle, throttle position, and brake pedal position (e.g., measured by respective position sensors).

Figure 2A:
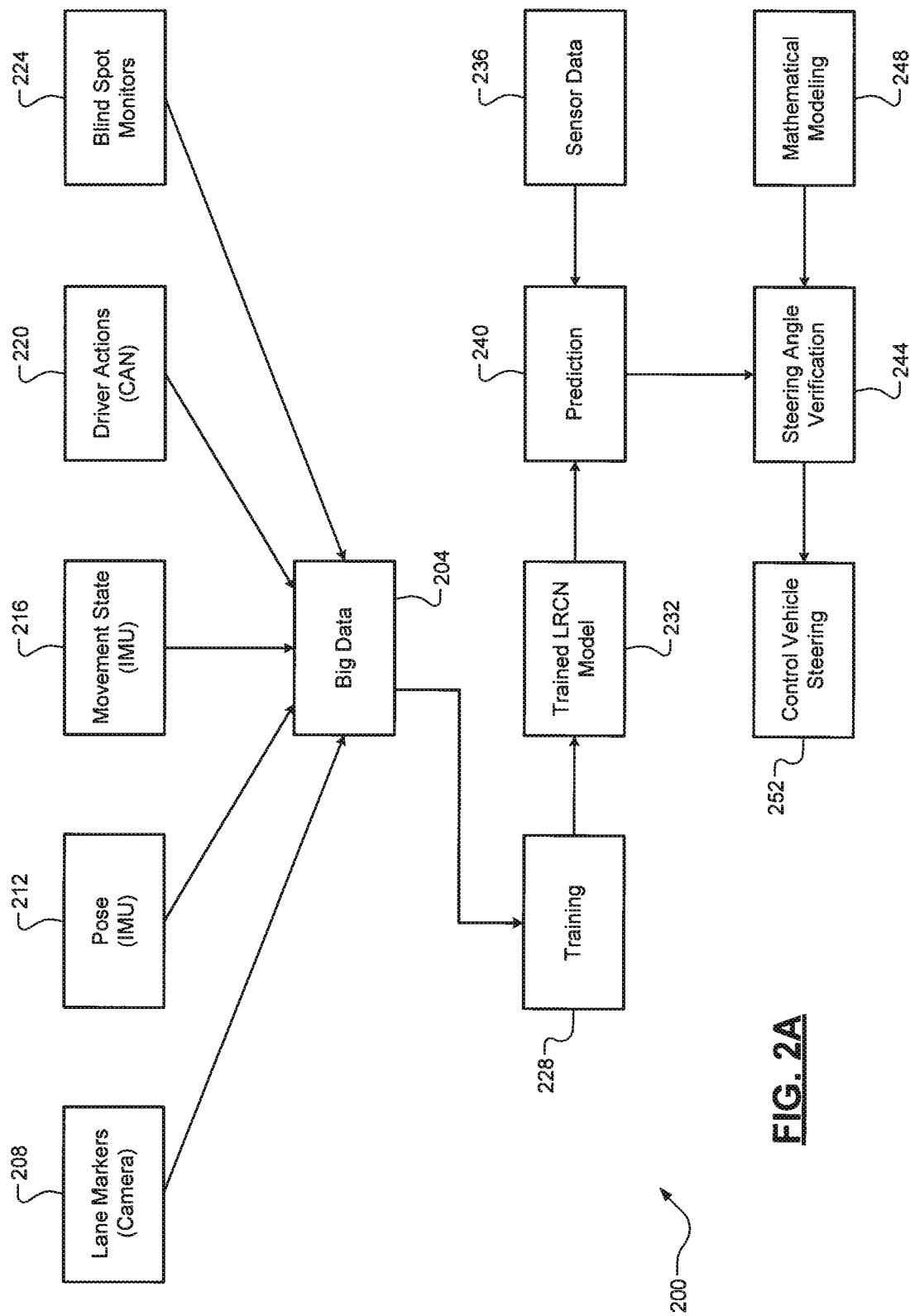
FIG. 2A is a functional block diagram of an example steering wheel angle planning and control architecture according to some implementations of the present disclosure.

Referring now to FIG. 2A, a functional block diagram of an example steering wheel angle sequence planning and control architecture 200 is illustrated. At 204, a large quantity of training data (also referred to as "Big Data") is gathered during controlled test driving by human test drivers. These human drivers operate the test vehicles as would be expected by a "good driver." In other words, the human test drivers try to operate the test vehicles as the average person would deem to be appropriate or acceptable quality driving. This could include, for example, maintaining the vehicle in a center of a lane between left and right lane markers, accelerating/braking appropriately, not taking turns too sharply, and the like. As illustrated, the Big Data 204 comprises hundreds of thousands or millions of data points indicative of (i) left/right lane markers 208 (e.g., from a camera system), (ii) test vehicle pose 212 (e.g., from IMU), (iii) test vehicle movement state 216 (e.g., from IMU), (iv) test driver actions 220 (e.g., from position/speed sensors), and optionally (v) blind spot monitoring 224 (e.g., from a blind spot monitoring system).

Figure 2B:
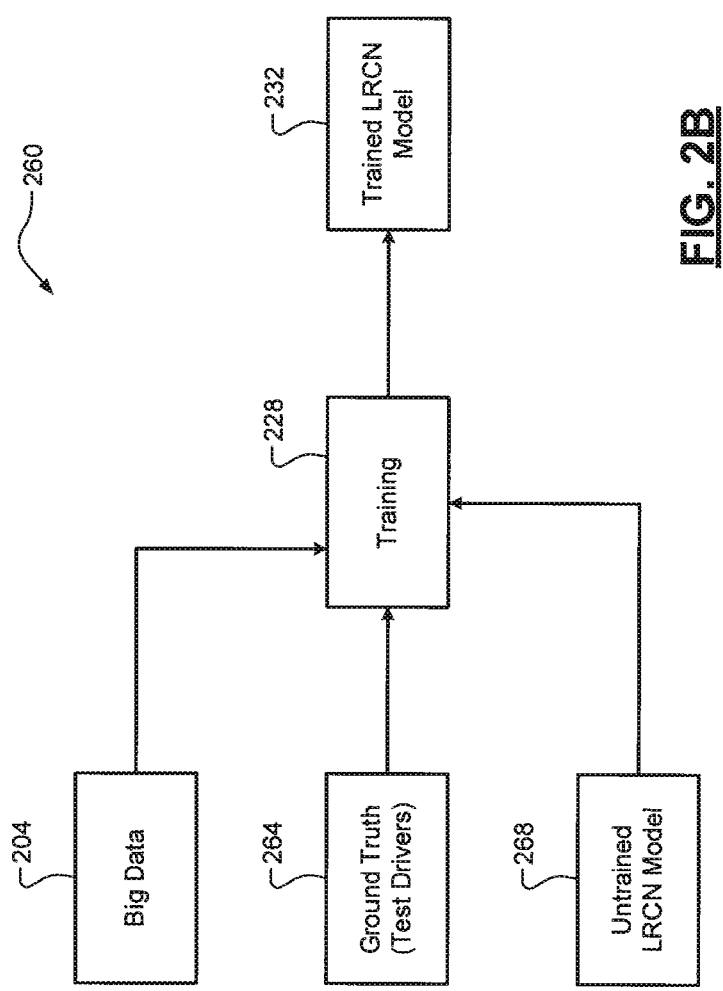
FIG. 2B is a functional block diagram of an example long-term recurrent convolutional network (LRCN) training architecture according to some implementations of the present disclosure.

This Big Data 204 is then utilized to train (e.g., via weakly-supervised learning) an LRCN model at 228, which is further illustrated in FIG. 2B. Referring now to FIG. 2B, a functional block diagram of an example LRCN model training architecture 260 is illustrated. As shown, the Big Data 204 and the corresponding ground truth 264 (the steering wheel angles) commanded by the test drivers during the controlled testing are combined with an untrained LRCN model 268 at training block 228. Because the recorded wheel angles commanded by the human test drivers during the controlled testing are treated as ground truth, the Big Data does not require further labeling or annotation, which saves costs. In some implementations, vehicle-to-vehicle transfer learning can also be performed to further refine the LRCN model 228. The output of training block 228 is the trained LRCN model 232, which is then utilized for steering wheel angle planning and control as shown in FIG. 2A and described in greater detail below.

An LRCN model is being utilized because it is both spatially and temporally deep, giving it the flexibility to be applied to a variety of tasks involving sequential inputs and outputs. LRCN models combine convolutional layers and long-range temporal recursion to create a trainable end-to-end model, which was previously achieved via extensively trained, very deep DNNs. For autonomous vehicle applications, the LRCN model is able to map variable-length inputs (e.g., a plurality of frames of vehicle data) to variable length outputs (e.g., a sequence of two or more steering wheel angles). More specifically, the LRCN model maps input sequences (e.g., lane markers, pose, movement state, driver's actions, etc.) to a sequence of hidden states, and then the hidden states to outputs (e.g., steering wheel angles) via specific recurrence equations. Once the trained LRCN model 232 is obtained, it is then utilized to control vehicle steering.

Referring again to FIG. 2A, this utilization could include, for example, obtaining sensor data from the sensor(s) 128. This includes a plurality of frames of data, with each frame including a plurality of data points (lane markers, pose, movement state, driver's actions, etc.). In some implementations, the sensor data further comprises variance and covariance values. This is because the measurements from the sensor(s) 128 are often accompanied by noise produced by physical, chemical, and/or mechanical quantities in the sensor(s) 128. The noise of each sensor 128 is mathematically expressible with variance and covariance and thus it can be accounted for accordingly, thereby improving sensor signal-to-noise ratio. The trained LRCN model 232 is utilized to determine a sequence of steering wheel angles (also referred to herein as "lateral controls") based on the various monitored parameters. The sensor data from 236 and the trained LRCN model 232 are fed to a prediction block where the trained LRCN model 240 predicts or otherwise determines a sequence of steering wheel angles using the sensor data as the inputs.

The determined sequence of steering wheel angles is then compared at 244 to a modeled sequence of steering wheel angles generated by mathematical models 248 for verification. This could include, for example, determining whether the determined sequence of steering wheel angles is within a threshold from the modeled sequence of steering wheel angles. In one exemplary implementation, the mathematical models 248 are Simulink models built for a variety of specific driving scenarios, but it will be appreciated that any suitable modeling techniques could be utilized as part of the verification process. When the determined sequence of steering wheel angles is verified at 244, it can then be utilized to control vehicle steering at 252. This could include, for example, commanding the steering actuator 132 according to the determined sequence of steering wheel angles. It will be appreciated that the sequence of steering wheel angles could be utilized to control another actuator or control system of the vehicle 100 to perform the desired lateral controls.

Figure 3:
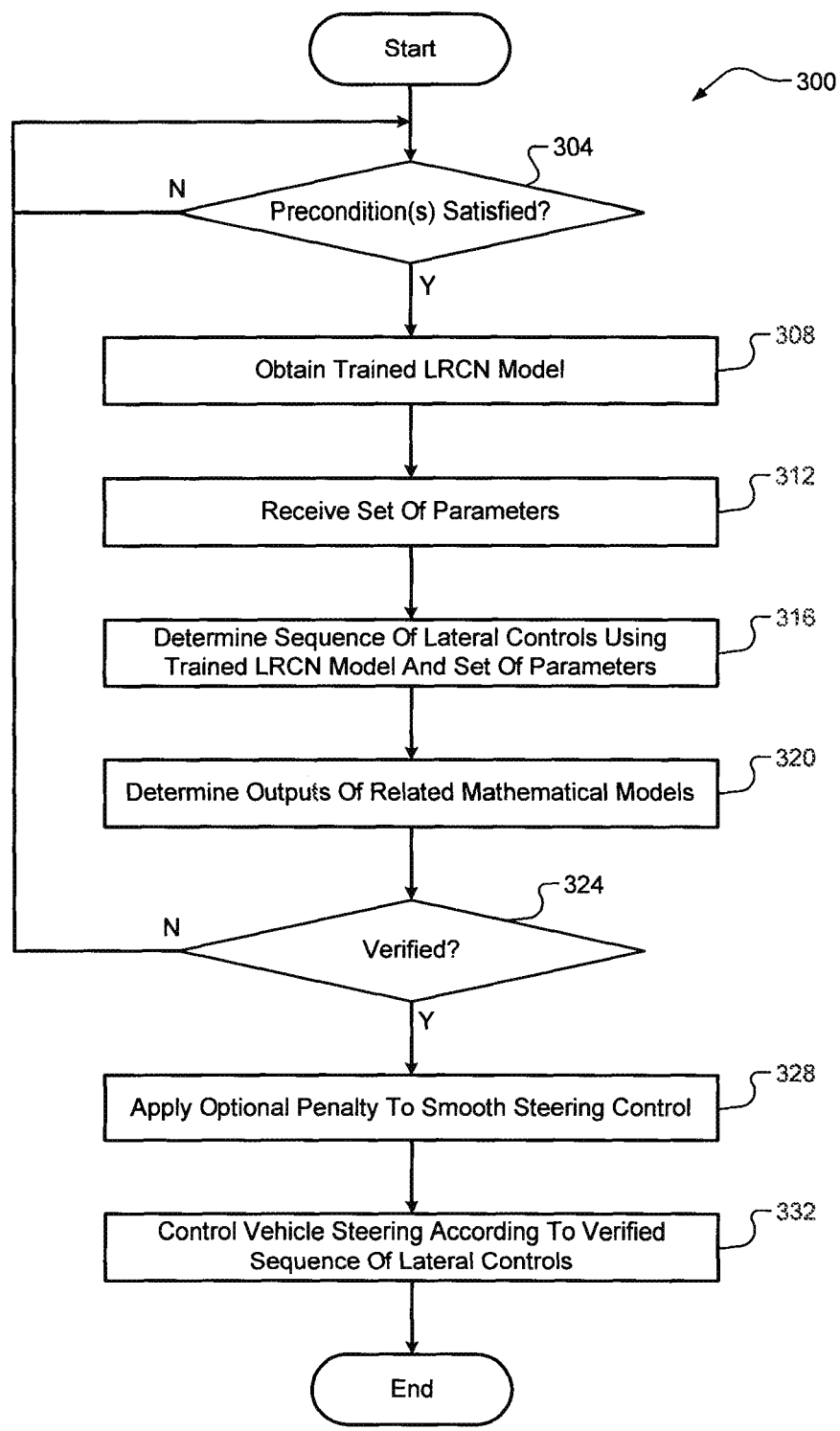
FIG. 3 is a flow diagram of an example method of planning and controlling a sequence of steering wheel angles according to some implementations of the present disclosure.

Referring now to FIG. 3, a flow diagram of method 300 of planning and executing a sequence of lateral controls for a vehicle is illustrated. For purposes of this disclosure, the method 300 will refer to vehicle 100 and its components, but it will be appreciated that the method 300 could be applicable to any suitable vehicle. At optional 304, one or more precondition(s) are checked to have been satisfied. This could include, for example, the LRCN model having been fully trained and the vehicle 100 being operated in a partial or fully autonomous driving mode. For example only, the autonomous driving mode could be enabled and disabled by the driver via the driver interface 120. When the precondition(s) are satisfied, the method 300 proceeds to 308. Otherwise, the method 300 ends or returns to 304. At 308, the controller 116 obtains the fully trained LRCN model (e.g., loads it into its memory). At 312, the controller 116 receives the set of parameters from the set of sensors 128. This could also include receiving the variance and covariance of the set of sensors 128 to account for sensor noise. At 316, the controller 116 uses the trained LRCN model and the set of parameters to determine a sequence of two or more steering wheel angles. At 320, the controller 116 uses mathematical models (e.g., Simulink models) to generate a modeled sequence of steering angles.

At 324, the controller 116 determines whether the determined sequence of steering angles is verified based on comparison to the modeled sequence of steering wheel angles. This could include, for example, determining whether the determined and modeled values are within thresholds from each other. When true, the method 300 proceeds to 328. Otherwise, the method 300 ends or returns to 304. At optional 328, the controller 116 applies a penalty to the sequence of steering wheel angles at consecutive time steps to encourage prediction smoothness and keep the vehicle driving with the lane. This could also be described as a safety policy and could also check the bounding (e.g., upper and lower limits) of the sequence of steering angles. At 332, the controller 116 finally controls vehicle steering according to the determined and verified sequence of steering angles. This could include, for example, commanding the steering actuator 132 according to the determined and verified sequence of steering angles. The method 300 the ends or returns to 304.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The controller could also include a memory as described above for storing template images. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An advanced driver assistance system (ADAS) for a vehicle, the ADAS comprising:
   a set of sensors configured to determine a set of parameters comprising road lane lines, a pose of the vehicle, a movement state of the vehicle, and actions by a driver of the vehicle; and
   a controller configured to operate the vehicle in an autonomous driving mode and during the autonomous driving mode:
      receive the set of parameters from the set of sensors;
      obtain a long-term recurrent convolutional network (LRCN) model that has been trained with training data captured during controlled test driving by a human driver;
      using the LRCN model and the set of parameters as inputs, determine a sequence of a plurality of desired steering wheel angles for the vehicle;
      verify the sequence of the plurality of desired steering wheel angles based on a comparison to outputs of one or more mathematical models that each model a specific driving scenario; and
      when the sequence of the plurality of desired steering wheel angles is verified, control steering of the vehicle according to the sequence of a plurality of desired steering wheel angles.

2. The ADAS of claim 1, wherein the controller is further configured to apply a penalty to the sequence of steering wheel angles at consecutive time steps to smooth the control of the steering of the vehicle.

3. The ADAS of claim 1, wherein the controller does not utilize a deep neural network (DNN).

4. The ADAS of claim 1, wherein the set of sensors comprises a camera system configured to capture an image of a road on which the vehicle is traveling and detect lane lines on the road.

5. The ADAS of claim 1, wherein the pose of the vehicle comprises yaw, pitch, and roll of the vehicle.

6. The ADAS of claim 1, wherein the movement state of the vehicle comprises velocity, acceleration, road wheel angle, and angular acceleration of the vehicle.

7. The ADAS of claim 1, wherein the actions by the driver of the vehicle comprise steering wheel angle, throttle position, and brake pedal position.

8. The ADAS of claim 1, wherein the one or more mathematical models comprise Simulink models.

9. A method for planning and executing a sequence of lateral controls for a vehicle, the method comprising:
 determining, by a set of sensors of the vehicle, a set of parameters comprising road lane lines, a pose of the vehicle, a movement state of the vehicle, and actions by a driver of the vehicle;
 operating, by a controller of the vehicle, in an autonomous driving mode; and
 during the autonomous driving mode:
  receiving, by the controller and from the set of sensors, the set of parameters;
  obtaining, by the controller, a long-term recurrent convolutional network (LRCN) model that has been trained with training data captured during controlled test driving by a human driver;
  using the LRCN model and the set of parameters as inputs, determining, by the controller, a sequence of a plurality of desired steering wheel angles for the vehicle;
  verifying, by the controller, the sequence of the plurality of desired steering wheel angles based on a comparison to outputs of one or more mathematical models that each model a specific driving scenario; and
  when the sequence of the plurality of desired steering wheel angles is verified, controlling, by the controller, steering of the vehicle according to the sequence of a plurality of desired steering wheel angles.

10. The method of claim 9, wherein the set of sensors comprises a camera system configured to capture an image of a road on which the vehicle is traveling and detect lane lines on the road.

11. The method of claim 9, wherein the pose of the vehicle comprises yaw, pitch, and roll of the vehicle.

12. The method of claim 9, wherein the movement state of the vehicle comprises velocity, acceleration, road wheel angle, and angular acceleration of the vehicle.

13. The method of claim 9, wherein the actions by the driver of the vehicle comprise steering wheel angle, throttle position, and brake pedal position.

14. The method of claim 9, wherein the one or more mathematical models comprise Simulink models.

15. The method of claim 9, further comprising applying, by the controller, a penalty to the sequence of steering wheel angles at consecutive time steps to smooth the control of the steering of the vehicle.

16. The method of claim 9, wherein the controller does not utilize a deep neural network (DNN).

* * * * *